US011459522B2

(12) United States Patent
Carrejo et al.

(10) Patent No.: US 11,459,522 B2
(45) Date of Patent: Oct. 4, 2022

(54) OILFIELD DRILLING LUBRICANT FOR WATER-BASED AND OIL-BASED SYSTEMS

(71) Applicant: Centurion Technologies, LLC, Bossier City, LA (US)

(72) Inventors: Nicholas Carrejo, Katy, TX (US); Seth Wiman, Benton, LA (US)

(73) Assignee: Centurion Technologies, LLC, Bossier City, LA (US)

( * ) Notice: Subject to any disclaimer, the term of this patent is extended or adjusted under 35 U.S.C. 154(b) by 44 days.

(21) Appl. No.: 16/807,477

(22) Filed: Mar. 3, 2020

(65) Prior Publication Data

US 2021/0277321 A1 Sep. 9, 2021

(51) Int. Cl.
| | | |
|---|---|---|
| *C10M 169/04* | (2006.01) | |
| *C09K 8/03* | (2006.01) | |
| *C09K 8/34* | (2006.01) | |
| *C09K 8/04* | (2006.01) | |
| *C10N 50/00* | (2006.01) | |

(52) U.S. Cl.
CPC ........... *C10M 169/04* (2013.01); *C09K 8/032* (2013.01); *C09K 8/04* (2013.01); *C09K 8/34* (2013.01); *C09K 2208/28* (2013.01); *C09K 2208/34* (2013.01); *C10M 2201/041* (2013.01); *C10M 2201/10* (2013.01); *C10M 2203/1025* (2013.01); *C10M 2207/401* (2013.01); *C10N 2050/015* (2020.05)

(58) Field of Classification Search
CPC ............ C09K 8/032; C09K 8/04; C09K 8/34; C09K 2208/28; C09K 2208/34; C10M 101/02; C10M 101/04; C10M 125/02; C10M 125/08; C10M 169/04; C10M 2201/041; C10M 2201/10; C10M 2203/1025; C10M 2207/401

See application file for complete search history.

(56) References Cited

U.S. PATENT DOCUMENTS

| | | | | |
|---|---|---|---|---|
| 4,434,064 A | * | 2/1984 | Chao ................... | C10M 125/02 508/113 |
| 5,593,953 A | * | 1/1997 | Malchow, Jr. .......... | C09K 8/36 507/134 |
| 9,574,155 B2 | * | 2/2017 | Markovitz .......... | C10M 141/00 |

(Continued)

FOREIGN PATENT DOCUMENTS

WO   WO-2015191173 A1 * 12/2015   .......... C10M 125/08

*Primary Examiner* — James C Goloboy
(74) *Attorney, Agent, or Firm* — Kearney, McWilliams & Davis; Erik J. Osterrieder

(57) ABSTRACT

This disclosure provides compositions comprising a suspension package, wherein the suspension packaging consists of solids for suspending in one or more liquids, wherein the solids comprise at least one of: (1) diamond dust, nano-diamonds, or combinations thereof; (2) tungsten; (3) graphite, graphene, or combinations thereof; and (4) silicon carbide. Further, 0.25% through 6% by volume of the composition, with the one or more liquids being present, in a 14.0 ppg aqueous $CaBr_2$ solution, provides a coefficient of friction of less than 0.06 at a temperature between 250° F. and 400° F. at any time up through 10 minutes after combination of the 0.25% through 6% by volume of the composition to the 14.0 ppg aqueous $CaBr_2$.

17 Claims, 7 Drawing Sheets

| TEST RESULTS - 9.6 ppg $CaCl_2$ Brine | | | | | | | |
|---|---|---|---|---|---|---|---|
| LUBRICANT | VALUE | % VOL | 2 MINS. | 4 MINS. | 6 MINS. | 8 MINS. | 10 MINS. |
| LUBRICANT 1 | TORQUE READING | 2 | 2.3 | 2.3 | 2.4 | 2.5 | 2.7 |
| LUBRICANT 1 | COEFFICIENT OF FRICTION | 2 | 0.022 | 0.022 | 0.023 | 0.024 | 0.026 |
| LUBRICANT 1 | TORQUE READING | 4 | 1.6 | 1.4 | 1.4 | 1.3 | 1.3 |
| LUBRICANT 1 | COEFFICIENT OF FRICTION | 4 | 0.016 | 0.014 | 0.014 | 0.013 | 0.013 |
| LUBRICANT 1 | TORQUE READING | 6 | 1.3 | 1.4 | 1.4 | 1.3 | 1.2 |
| LUBRICANT 1 | COEFFICIENT OF FRICTION | 6 | 0.014 | 0.015 | 0.015 | 0.014 | 0.013 |
| LUBRICANT 2 | TORQUE READING | 2 | 1.0 | 1.1 | 1.2 | 1.1 | 1.1 |
| LUBRICANT 2 | COEFFICIENT OF FRICTION | 2 | 0.010 | 0.011 | 0.012 | 0.011 | 0.011 |
| LUBRICANT 2 | TORQUE READING | 4 | 2.8 | 2.9 | 2.6 | 2.3 | 2.0 |
| LUBRICANT 2 | COEFFICIENT OF FRICTION | 4 | 0.016 | 0.014 | 0.014 | 0.013 | 0.013 |
| LUBRICANT 2 | TORQUE READING | 6 | 1.1 | 1.1 | 1.0 | 1.1 | 1.2 |
| LUBRICANT 2 | COEFFICIENT OF FRICTION | 6 | 0.011 | 0.011 | 0.010 | 0.011 | 0.013 |

(56) References Cited

U.S. PATENT DOCUMENTS

| | | | |
|---|---|---|---|
| 2008/0223018 A1* | 9/2008 | Aradi | C10L 1/10 |
| | | | 60/274 |
| 2010/0075135 A1* | 3/2010 | Kendall | C08K 3/20 |
| | | | 428/323 |
| 2012/0032543 A1* | 2/2012 | Chakraborty | C10M 171/06 |
| | | | 310/90 |
| 2014/0020886 A1* | 1/2014 | Falkner | E21B 43/128 |
| | | | 166/66.4 |
| 2014/0106994 A1* | 4/2014 | Furukawa | C10M 169/04 |
| | | | 508/126 |
| 2016/0060563 A1* | 3/2016 | Kim | C10M 161/00 |
| | | | 508/287 |

* cited by examiner

FIGURE 1

TEST RESULTS - 9.6 ppg CaCl₂ Brine

| LUBRICANT | VALUE | % VOL | 2 MINS. | 4 MINS. | 6 MINS. | 8 MINS. | 10 MINS. |
|---|---|---|---|---|---|---|---|
| LUBRICANT 1 | TORQUE READING | 2 | 2.3 | 2.3 | 2.4 | 2.5 | 2.7 |
| LUBRICANT 1 | COEFFICIENT OF FRICTION | 2 | 0.022 | 0.022 | 0.023 | 0.024 | 0.026 |
| LUBRICANT 1 | TORQUE READING | 4 | 1.6 | 1.4 | 1.4 | 1.3 | 1.3 |
| LUBRICANT 1 | COEFFICIENT OF FRICTION | 4 | 0.016 | 0.014 | 0.014 | 0.013 | 0.013 |
| LUBRICANT 1 | TORQUE READING | 6 | 1.3 | 1.4 | 1.4 | 1.3 | 1.2 |
| LUBRICANT 1 | COEFFICIENT OF FRICTION | 6 | 0.014 | 0.015 | 0.015 | 0.014 | 0.013 |
| LUBRICANT 2 | TORQUE READING | 2 | 1.0 | 1.1 | 1.2 | 1.1 | 1.1 |
| LUBRICANT 2 | COEFFICIENT OF FRICTION | 2 | 0.010 | 0.011 | 0.012 | 0.011 | 0.011 |
| LUBRICANT 2 | TORQUE READING | 4 | 2.8 | 2.9 | 2.6 | 2.3 | 2.0 |
| LUBRICANT 2 | COEFFICIENT OF FRICTION | 4 | 0.016 | 0.014 | 0.014 | 0.013 | 0.013 |
| LUBRICANT 2 | TORQUE READING | 6 | 1.1 | 1.1 | 1.0 | 1.1 | 1.2 |
| LUBRICANT 2 | COEFFICIENT OF FRICTION | 6 | 0.011 | 0.011 | 0.010 | 0.011 | 0.013 |

FIGURE 2

TEST RESULTS - 10.6 ppg CaCl₂ Brine

| LUBRICANT | VALUE | % VOL | 2 MINS. | 4 MINS. | 6 MINS. | 8 MINS. | 10 MINS. |
|---|---|---|---|---|---|---|---|
| LUBRICANT 1 | TORQUE READING | 2 | 4.9 | 4.6 | 4.5 | 4.5 | 4.5 |
| LUBRICANT 1 | COEFFICIENT OF FRICTION | 2 | 0.047 | 0.044 | 0.043 | 0.043 | 0.043 |
| LUBRICANT 1 | TORQUE READING | 4 | 1.3 | 1.4 | 1.6 | 1.6 | 1.5 |
| LUBRICANT 1 | COEFFICIENT OF FRICTION | 4 | 0.013 | 0.014 | 0.016 | 0.016 | 0.015 |
| LUBRICANT 1 | TORQUE READING | 6 | 1.5 | 1.4 | 1.7 | 1.8 | 1.8 |
| LUBRICANT 1 | COEFFICIENT OF FRICTION | 6 | 0.016 | 0.015 | 0.018 | 0.019 | 0.019 |
| LUBRICANT 2 | TORQUE READING | 2 | 1.2 | 1.2 | 1.0 | 1.0 | 1.0 |
| LUBRICANT 2 | COEFFICIENT OF FRICTION | 2 | 0.012 | 0.012 | 0.010 | 0.010 | 0.010 |
| LUBRICANT 2 | TORQUE READING | 4 | 1.0 | 1.0 | 1.1 | 1.0 | 1.1 |
| LUBRICANT 2 | COEFFICIENT OF FRICTION | 4 | 0.010 | 0.010 | 0.011 | 0.010 | 0.011 |
| LUBRICANT 2 | TORQUE READING | 6 | 1.4 | 1.1 | 1.1 | 1.1 | 1.1 |
| LUBRICANT 2 | COEFFICIENT OF FRICTION | 6 | 0.015 | 0.011 | 0.011 | 0.011 | 0.011 |

*FIGURE 3*

TEST RESULTS - 11.6 ppg CaCl$_2$ Brine

| LUBRICANT | VALUE | % VOL | 2 MINS. | 4 MINS. | 6 MINS. | 8 MINS. | 10 MINS. |
|---|---|---|---|---|---|---|---|
| LUBRICANT 1 | TORQUE READING | 2 | 9.6 | 11.4 | 11.5 | 11.0 | 11.9 |
| LUBRICANT 1 | COEFFICIENT OF FRICTION | 2 | 0.093 | 0.110 | 0.111 | 0.106 | 0.115 |
| LUBRICANT 1 | TORQUE READING | 4 | 3.9 | 3.9 | 4.3 | 4.9 | 5.4 |
| LUBRICANT 1 | COEFFICIENT OF FRICTION | 4 | 0.039 | 0.039 | 0.043 | 0.049 | 0.054 |
| LUBRICANT 1 | TORQUE READING | 6 | 2.4 | 2.9 | 3.6 | 4.0 | 4.8 |
| LUBRICANT 1 | COEFFICIENT OF FRICTION | 6 | 0.025 | 0.030 | 0.038 | 0.042 | 0.050 |
| LUBRICANT 2 | TORQUE READING | 2 | 0.8 | 1.0 | 0.9 | 0.9 | 0.9 |
| LUBRICANT 2 | COEFFICIENT OF FRICTION | 2 | 0.008 | 0.010 | 0.009 | 0.009 | 0.009 |
| LUBRICANT 2 | TORQUE READING | 4 | 5.3 | 6.7 | 7.0 | 7.1 | 7.0 |
| LUBRICANT 2 | COEFFICIENT OF FRICTION | 4 | 0.053 | 0.067 | 0.070 | 0.071 | 0.070 |
| LUBRICANT 2 | TORQUE READING | 6 | 1.5 | 2.0 | 2.4 | 3.0 | 4.1 |
| LUBRICANT 2 | COEFFICIENT OF FRICTION | 6 | 0.016 | 0.021 | 0.025 | 0.031 | 0.043 |

*FIGURE 4*

TEST RESULTS - 12.0 ppg CaBr$_2$ Brine

| LUBRICANT | VALUE | % VOL | 2 MINS. | 4 MINS. | 6 MINS. | 8 MINS. | 10 MINS. |
|---|---|---|---|---|---|---|---|
| LUBRICANT 1 | TORQUE READING | 2 | 2.1 | 2.3 | 2.4 | 2.6 | 2.9 |
| LUBRICANT 1 | COEFFICIENT OF FRICTION | 2 | 0.020 | 0.022 | 0.023 | 0.025 | 0.028 |
| LUBRICANT 1 | TORQUE READING | 4 | 1.2 | 1.9 | 2.3 | 2.8 | 3.5 |
| LUBRICANT 1 | COEFFICIENT OF FRICTION | 4 | 0.012 | 0.019 | 0.023 | 0.028 | 0.035 |
| LUBRICANT 1 | TORQUE READING | 6 | 1.2 | 1.2 | 1.1 | 1.5 | 1.6 |
| LUBRICANT 1 | COEFFICIENT OF FRICTION | 6 | 0.013 | 0.013 | 0.012 | 0.016 | 0.017 |
| LUBRICANT 2 | TORQUE READING | 2 | 0.8 | 0.9 | 0.8 | 0.9 | 0.7 |
| LUBRICANT 2 | COEFFICIENT OF FRICTION | 2 | 0.008 | 0.009 | 0.008 | 0.009 | 0.007 |
| LUBRICANT 2 | TORQUE READING | 4 | 1.3 | 1.4 | 1.6 | 1.4 | 1.3 |
| LUBRICANT 2 | COEFFICIENT OF FRICTION | 4 | 0.013 | 0.014 | 0.016 | 0.014 | 0.013 |
| LUBRICANT 2 | TORQUE READING | 6 | 1.2 | 1.3 | 1.3 | 1.2 | 1.2 |
| LUBRICANT 2 | COEFFICIENT OF FRICTION | 6 | 0.013 | 0.014 | 0.014 | 0.013 | 0.013 |

FIGURE 5

TEST RESULTS - 13.0 ppg CaBr₂ Brine

| LUBRICANT | VALUE | % VOL | 2 MINS. | 4 MINS. | 6 MINS. | 8 MINS. | 10 MINS. |
|---|---|---|---|---|---|---|---|
| LUBRICANT 1 | TORQUE READING | 2 | 5.3 | 7.5 | 9.8 | 10.8 | 11.2 |
| LUBRICANT 1 | COEFFICIENT OF FRICTION | 2 | 0.051 | 0.072 | 0.095 | 0.104 | 0.108 |
| LUBRICANT 1 | TORQUE READING | 4 | 3.4 | 4.8 | 8.9 | 8.8 | 8.8 |
| LUBRICANT 1 | COEFFICIENT OF FRICTION | 4 | 0.034 | 0.048 | 0.089 | 0.088 | 0.088 |
| LUBRICANT 1 | TORQUE READING | 6 | 1.3 | 1.3 | 1.4 | 1.5 | 1.6 |
| LUBRICANT 1 | COEFFICIENT OF FRICTION | 6 | 0.014 | 0.014 | 0.015 | 0.016 | 0.017 |
| LUBRICANT 2 | TORQUE READING | 2 | 0.8 | 0.8 | 0.8 | 0.8 | 0.9 |
| LUBRICANT 2 | COEFFICIENT OF FRICTION | 2 | 0.008 | 0.008 | 0.008 | 0.008 | 0.009 |
| LUBRICANT 2 | TORQUE READING | 4 | 1.4 | 1.2 | 1.1 | 1.2 | 1.1 |
| LUBRICANT 2 | COEFFICIENT OF FRICTION | 4 | 0.014 | 0.012 | 0.011 | 0.012 | 0.011 |
| LUBRICANT 2 | TORQUE READING | 6 | 1.6 | 2.5 | 2.4 | 2.3 | 2.3 |
| LUBRICANT 2 | COEFFICIENT OF FRICTION | 6 | 0.017 | 0.026 | 0.025 | 0.024 | 0.024 |

FIGURE 6

TEST RESULTS - 14.0 ppg CaBr₂ Brine

| LUBRICANT | VALUE | % VOL | 2 MINS. | 4 MINS. | 6 MINS. | 8 MINS. | 10 MINS. |
|---|---|---|---|---|---|---|---|
| LUBRICANT 1 | TORQUE READING | 2 | 7.3 | 8.3 | 8.3 | 8.2 | 8.2 |
| LUBRICANT 1 | COEFFICIENT OF FRICTION | 2 | 0.071 | 0.080 | 0.080 | 0.079 | 0.079 |
| LUBRICANT 1 | TORQUE READING | 4 | 5.0 | 5.7 | 6.3 | 6.2 | 8.0 |
| LUBRICANT 1 | COEFFICIENT OF FRICTION | 4 | 0.050 | 0.057 | 0.063 | 0.062 | 0.080 |
| LUBRICANT 1 | TORQUE READING | 6 | 2.6 | 2.8 | 2.8 | 2.9 | 2.6 |
| LUBRICANT 1 | COEFFICIENT OF FRICTION | 6 | 0.027 | 0.029 | 0.029 | 0.030 | 0.027 |
| LUBRICANT 2 | TORQUE READING | 2 | 1.1 | 1.5 | 2.1 | 2.7 | 3.1 |
| LUBRICANT 2 | COEFFICIENT OF FRICTION | 2 | 0.011 | 0.014 | 0.020 | 0.026 | 0.031 |
| LUBRICANT 2 | TORQUE READING | 4 | 3.8 | 4.8 | 5.1 | 5.7 | 5.7 |
| LUBRICANT 2 | COEFFICIENT OF FRICTION | 4 | 0.038 | 0.048 | 0.051 | 0.057 | 0.057 |
| LUBRICANT 2 | TORQUE READING | 6 | 1.6 | 1.9 | 2.3 | 2.5 | 2.4 |
| LUBRICANT 2 | COEFFICIENT OF FRICTION | 6 | 0.017 | 0.020 | 0.024 | 0.026 | 0.025 |

FIGURE 7

TEST RESULTS - 14.0 ppg CaBr₂ Brine - Lubricant 1

| AGING TEMP. | % VOL. LUBE | COF - 2 MINS. | COF - 4 MINS. | COF - 6 MINS. | COF - 8 MINS. | COF - 10 MINS. |
|---|---|---|---|---|---|---|
| 250°F | 0.25 | 0.030 | 0.029 | 0.031 | 0.031 | 0.028 |
| 250°F | 0.75 | 0.027 | 0.025 | 0.028 | 0.028 | 0.027 |
| 250°F | 1.25 | 0.025 | 0.027 | 0.028 | 0.028 | 0.027 |
| 250°F | 1.75 | 0.019 | 0.018 | 0.016 | 0.016 | 0.014 |
| 300°F | 0.25 | 0.023 | 0.023 | 0.027 | 0.028 | 0.027 |
| 300°F | 0.75 | 0.023 | 0.023 | 0.021 | 0.021 | 0.023 |
| 300°F | 1.25 | 0.019 | 0.019 | 0.016 | 0.017 | 0.016 |
| 300°F | 1.75 | 0.017 | 0.017 | 0.015 | 0.014 | 0.013 |
| 350°F | 0.25 | 0.024 | 0.026 | 0.027 | 0.019 | 0.020 |
| 350°F | 0.75 | 0.016 | 0.015 | 0.014 | 0.014 | 0.014 |
| 350°F | 1.25 | 0.013 | 0.014 | 0.013 | 0.012 | 0.014 |
| 350°F | 1.75 | 0.016 | 0.012 | 0.012 | 0.011 | 0.011 |
| 400°F | 0.25 | 0.024 | 0.022 | 0.019 | 0.019 | 0.020 |
| 400°F | 0.75 | 0.025 | 0.020 | 0.019 | 0.019 | 0.016 |
| 400°F | 1.25 | 0.021 | 0.016 | 0.016 | 0.018 | 0.019 |
| 400°F | 1.75 | 0.015 | 0.016 | 0.015 | 0.012 | 0.011 |

FIGURE 8

TEST RESULTS - 14.0 ppg CaBr₂ Brine - Lubricant 2

| AGING TEMP. | % VOL. LUBE | COF - 2 MINS. | COF - 4 MINS. | COF - 6 MINS. | COF - 8 MINS. | COF - 10 MINS. |
|---|---|---|---|---|---|---|
| 250°F | 0.25 | 0.026 | 0.025 | 0.028 | 0.029 | 0.028 |
| 250°F | 0.75 | 0.021 | 0.026 | 0.024 | 0.024 | 0.025 |
| 250°F | 1.25 | 0.019 | 0.018 | 0.018 | 0.017 | 0.018 |
| 250°F | 1.75 | 0.011 | 0.011 | 0.014 | 0.013 | 0.013 |
| 300°F | 0.25 | 0.032 | 0.034 | 0.034 | 0.033 | 0.034 |
| 300°F | 0.75 | 0.028 | 0.028 | 0.029 | 0.029 | 0.033 |
| 300°F | 1.25 | 0.020 | 0.021 | 0.020 | 0.019 | 0.019 |
| 300°F | 1.75 | 0.015 | 0.014 | 0.014 | 0.014 | 0.015 |
| 350°F | 0.25 | 0.034 | 0.030 | 0.027 | 0.027 | 0.025 |
| 350°F | 0.75 | 0.023 | 0.020 | 0.020 | 0.021 | 0.023 |
| 350°F | 1.25 | 0.022 | 0.020 | 0.021 | 0.021 | 0.022 |
| 350°F | 1.75 | 0.018 | 0.017 | 0.017 | 0.015 | 0.017 |
| 400°F | 0.25 | 0.057 | 0.061 | 0.063 | 0.060 | 0.060 |
| 400°F | 0.75 | 0.049 | 0.051 | 0.050 | 0.056 | 0.054 |
| 400°F | 1.25 | 0.050 | 0.050 | 0.048 | 0.046 | 0.047 |
| 400°F | 1.75 | 0.038 | 0.036 | 0.037 | 0.035 | 0.036 |

FIGURE 9

TEST RESULTS - 14.0 ppg CaBr₂ Brine - Lubricant 1

| AGING TEMP. | % VOL. LUBE | COF - 2 MINS. | COF - 4 MINS. | COF - 6 MINS. | COF - 8 MINS. | COF - 10 MINS. |
|---|---|---|---|---|---|---|
| 250°F | 2 | 0.038 | 0.038 | 0.039 | 0.040 | 0.042 |
| 250°F | 4 | 0.033 | 0.033 | 0.034 | 0.036 | 0.036 |
| 250°F | 6 | 0.029 | 0.029 | 0.027 | 0.029 | 0.028 |
| 300°F | 2 | 0.021 | 0.022 | 0.024 | 0.022 | 0.022 |
| 300°F | 4 | 0.022 | 0.020 | 0.021 | 0.021 | 0.020 |
| 300°F | 6 | 0.019 | 0.023 | 0.022 | 0.020 | 0.020 |
| 350°F | 2 | 0.016 | 0.018 | 0.019 | 0.022 | 0.029 |
| 350°F | 4 | 0.016 | 0.017 | 0.017 | 0.019 | 0.021 |
| 350°F | 6 | 0.014 | 0.014 | 0.014 | 0.017 | 0.014 |
| 400°F | 2 | 0.047 | 0.041 | 0.045 | 0.038 | 0.039 |
| 400°F | 4 | 0.039 | 0.037 | 0.036 | 0.035 | 0.034 |
| 400°F | 6 | 0.035 | 0.037 | 0.038 | 0.037 | 0.037 |

FIGURE 10

TEST RESULTS - 14.0 ppg CaBr₂ Brine - Lubricant 2

| AGING TEMP. | % VOL. LUBE | COF - 2 MINS. | COF - 4 MINS. | COF - 6 MINS. | COF - 8 MINS. | COF - 10 MINS. |
|---|---|---|---|---|---|---|
| 250°F | 2 | 0.016 | 0.014 | 0.014 | 0.014 | 0.015 |
| 250°F | 4 | 0.013 | 0.014 | 0.013 | 0.016 | 0.018 |
| 250°F | 6 | 0.011 | 0.012 | 0.012 | 0.012 | 0.013 |
| 300°F | 2 | 0.014 | 0.015 | 0.016 | 0.015 | 0.015 |
| 300°F | 4 | 0.013 | 0.014 | 0.013 | 0.013 | 0.015 |
| 300°F | 6 | 0.013 | 0.013 | 0.012 | 0.011 | 0.013 |
| 350°F | 2 | 0.014 | 0.013 | 0.013 | 0.013 | 0.015 |
| 350°F | 4 | 0.011 | 0.013 | 0.013 | 0.013 | 0.014 |
| 350°F | 6 | 0.011 | 0.012 | 0.013 | 0.013 | 0.014 |
| 400°F | 2 | 0.056 | 0.053 | 0.053 | 0.054 | 0.055 |
| 400°F | 4 | 0.040 | 0.040 | 0.037 | 0.039 | 0.040 |
| 400°F | 6 | 0.037 | 0.037 | 0.037 | 0.038 | 0.036 |

OILFIELD DRILLING LUBRICANT FOR WATER-BASED AND OIL-BASED SYSTEMS

FIELD

This disclosure relates to compositions of a lubricant in water-based or oil-based systems that in example embodiments, for example, may be used in oilfield drilling applications.

BACKGROUND

A lubricant is a composition often used to reduce friction, i.e., lubricity, between surfaces in mutual contact, which ultimately reduces the heat generated when the surfaces move. A lubricant may also function to transmit forces, transport foreign particles, and/or heat or cool the surfaces.

Lubricants are used for many other purposes, such as cooking, e.g., oils and fats in use in frying pans, bio-applications on humans, e.g., in artificial joints, and in ultrasound or medical examinations. Principally, lubricants reduce friction and contribute to a improved functioning of a mechanism.

Another application, such as through use of the compositions in this disclosure, may be to reduce torque and/or drag during a drilling and completion application. Advantages of the disclosed compositions may include one or more of the following: reducing differential sticking, improving smoothness of movement between metal-on-metal or metal-on-rock interfaces, lowering the coefficient of friction ("COF"), permitting high rotation-per-minute ("RPM") drilling, mitigating formation damage, improve compatibility with completion fluid chemistries, permit improved rotary and/or coiled-tubing drilling, increase lateral downhole reach, and provide improvements in operability in high-pressure/high-temperature applications and high brine concentrations.

SUMMARY

In one example embodiment, disclosed is a composition comprising a suspension package, wherein the suspension packaging consists of solids for suspending in one or more liquids, wherein the solids comprise at least one of: (1) diamond dust, nano-diamonds, or combinations thereof; (2) tungsten; (3) graphite, graphene, or combinations thereof; and (4) silicon carbide. Further, 0.25% through 6% by volume of the composition, with the one or more liquids being present, in a 14.0 ppg aqueous $CaBr_2$ solution, provides a coefficient of friction of less than 0.065 at a temperature between 250° F. and 400° F. at any time up through 10 minutes after combination of the 0.25% through 6% by volume of the composition to the 14.0 ppg aqueous $CaBr_2$.

BRIEF DESCRIPTION OF THE DRAWINGS

So that the manner in which the above recited features, advantages and objects of this disclosure are attained and may be understood in detail, a more particular description, briefly summarized above, may be had by reference to the embodiments thereof which are illustrated in the appended drawings.

It is to be noted, however, that the appended drawings illustrate only typical embodiments of this disclosure and are therefore not to be considered limiting of its scope, for the disclosure may admit to other equally effective embodiments.

FIGS. 1-3 show lubricity test results for 2% through 6% by volume of the disclosed composition suspended in liquid in an aqueous $CaCl_2$ solution.

FIGS. 4-10 show lubricity test results that fall somewhere in the range from 0.25% through 6% by volume of the disclosed composition suspended in liquid in an aqueous $CaBr_2$ solution.

DETAILED DESCRIPTION

Various specific embodiments, versions and examples are described herein, including exemplary embodiments and definitions that are adopted herein for purposes of understanding. While the following detailed description gives specific preferred embodiments, those skilled in the art will appreciate that these embodiments are exemplary only, and that the disclosure can be practiced in other ways. For purposes of determining infringement, the scope of the invention will refer to the any claims, including their equivalents, and elements or limitations that are equivalent to those that are recited.

As used herein, "about" means the number itself and/or within 5% of the stated number. For instance, with about 5%, this means 5 and/or any number or range within the range of 4.75 to 5.25, e.g., 4.75 to 4.96, 4.81 to 5.1, etc.

Generally, disclosed are compositions of lubricants. In one example embodiment, the lubricant comprises a suspension package comprising, consisting essentially of, or consisting of solids for suspending in one or more liquids, wherein the solids comprise at least one, at least two, at least three, or all four of: (1) diamond dust, nano-diamonds, or combinations thereof; (2) tungsten; (3) graphite, graphene, or combinations thereof; and (4) silicon carbide. Further, 0.25% through 6% by volume of the composition, with the one or more liquids being present, in a 14.0 ppg aqueous $CaBr_2$ solution, provides a dynamic coefficient of friction of less than 0.055 at a temperature between 250° F. and 400° F. at any time up through 10 minutes after combination of the 0.25% through 6% by volume of the composition to the 14.0 ppg aqueous $CaBr_2$.

The one or more liquids for suspending the solids in the suspension package may comprise, consists essentially, or consists of one or more vegetable oils, syntenic oils, or combinations thereof. Examples of vegetable oils include, but are not limited to canola, rapeseed, cottonseed, sunflower, caster, and combinations thereof. The concentration of the oil(s) in the composition may range from about 5 wt. % through 95 wt. %. Without being pedantic, the specific range for concentration of the oil(s) may be any range therebetween, and the ratio of one oil to any other oil(s) in the composition may be any combination. And avoiding pedantry again, if there are two oils, then the ratio of oil 1 to oil 2 may be 1:1, 1:2, 1:10, etc. By way of another example, if there are three oils, then the ratio of oil 1 to oil 2 to oil 3 may be 1:1:2, 1:5:3, 1:10:100, etc.

With regard to the solid(s) in the suspension package that are suspended in one or more liquids, there may be one, two, three or all four of the following solids in the composition: (1) diamond dust, nano-diamonds, or combinations thereof; (2) tungsten; (3) graphite, graphene, or combinations thereof; and (4) silicon carbide. The amount of these solid(s) in the composition may be any amount equal to or less than 10 wt. %. That is, in some example embodiments, the solid(s) may amount to 0.1 wt. %, 0.25 wt. %, 0.5 wt. %, 1.0 wt. %, 2.0 wt. %, 3.0 wt. %, 4.0 wt. %, 5.0 wt. %, 6.0 wt. %, 7.0 wt. %, 8.0 wt. %, 9.0 wt. %, 10.0 wt. %, or within any range therebetween. In still other example embodiments, the solid(s) may amount to greater than 10 wt. %, e.g., 15.0 wt. %, 20.0 wt. %, 25.0 wt. %, 30 wt. %, 35.0 wt. %, 40.0 wt. %, or any ranges in between any of these weight percentages of the composition.

With regard to the solid(s) in the suspension package that are suspended in one or more liquids, their size, which a commercial vendor may certify, may fall anywhere within the following claimed ranges and/or within any range therebetween: (1) diamond dust and/or nano-diamonds: from 5 nm through 25 nm; (2) tungsten: from 35 nm through 90 nm; (3) graphite and/or graphene: greater than 50 nm and less than or equal 44 microns, wherein use of graphite, as opposed to graphene, in the disclosed compositions is generally a microparticle falling within this range rather than a nanoparticle within this range; and (4) silicon carbide: from 10 nm through 160 nm. By "within any range therebetween," what is meant is diamond dust particles may be sized from 5 nm through 15 nm, 8 nm through 17 nm, etc. and similarly for the other solids. Notably, the diamond dust and/or nano-diamonds increase friction reduction and lasts longer than other many other tested solids. Also, tungsten increases friction reduction, including increased forces arising by increasing pressure and/or temperature, e.g., at temperatures of about 350° F., 400° F., 800° F., 1000° F., and greater and/or at pressures up to 300 kpsi.

The suspension package and/or composition may further include additives. Additives may include, but are not limited to, opacifying agents, pigments, colorants, slip agents, antioxidants, anticorrosive agents, anti-fog agents, anti-static agents, anti-block agents, fillers, rheology additives, moisture barrier additives, gas barrier additives, gas scavengers, thixotropic agents that may be activators, activators, and combinations thereof. Examples of activators may include, for example, clays, surfactants, and combinations thereof. Such additives may be used in effective amounts, which vary depending upon the property required. The amount of the additives and nanoparticle solids (i.e., diamond dust, nano-diamonds, or combinations thereof; tungsten; graphite, graphene, or combinations thereof even though graphene may technically be a microparticle in various embodiments based on the size range previously disclosed) in the suspension package may result in the suspension package and these solids comprising, consisting essentially of, or consisting of 10 wt % or less in some embodiments or greater than 10 wt % in other embodiments.

Addition of thixotropic agent(s) to the suspension package or composition may be reinforced with an activator. In one instance, the thixotropic agent and activator mitigate against or prevent separation of the composition, i.e., the lubricant, in solution, and permit the solution to regain viscosity after experiencing high sheer, pressures, etc. Additionally and alternatively, using multiple oils with the suspension package may provide a stable emulsion that mitigates against or prevent separation, in some cases indefinitely, so as to suspend the solids in solution.

Turning now to the figures, the lubricity tests were conducted according to API Recommended Practice, and calibrations of all equipment were performed according to API and manufacturer specifications. For the lubricity test data shown in FIGS. 1-6, the tests were performed on various brine solutions at 75° F. with two lubricants, namely lubricant 1 and lubricant 2, both of which comprise less than or equal to 10 wt. % nanoparticle solids suspended in oil, wherein from 0.25% through 6% by volume of this composition in a 14.0 ppg aqueous $CaBr_2$ solution, provides a coefficient of friction of less than 0.055 at a temperature between 250° F. and 400° F. at any time up through 10 minutes. In particular, both of these lubricants comprise graphite/graphene, clay-based thixotropic agents, an activator comprising water, and a rheology additive to reinforce the efficacy of the thixotropic agents, wherein lubricant 1's composition is in synthetic oil and lubricant 2's composition is in vegetable oil.

FIG. 1 shows, among other things, that from 2% through 6% by volume of the composition, with the one or more liquids being present, in a 9.6 ppg aqueous $CaCl_2$ solution, provides a coefficient of friction of equal to or less than 0.03 at a temperature of 75° F. at any time up through 10 minutes after combination of the 2% through 6% by volume of the composition to the 9.6 ppg aqueous $CaCl_2$ solution.

FIG. 2 shows, among other things, that from 2% through 6% by volume of the composition, with the one or more liquids being present, in a 10.6 ppg aqueous $CaCl_2$ solution, provides a coefficient of friction of equal to or less than 0.05 at a temperature of 75° F. at any time up through 10 minutes after combination of the 2% through 6% by volume of the composition to the 10.6 ppg aqueous $CaCl_2$ solution.

FIG. 3 shows, among other things, that from 2% through 6% by volume of the composition, with the one or more liquids being present, in a 11.6 ppg aqueous $CaCl_2$ solution, provides a coefficient of friction of equal to or less than 0.12 at a temperature of 75° F. at any time up through 10 minutes after combination of the 2% through 6% by volume of the composition to the 11.6 ppg aqueous $CaCl_2$ solution.

FIG. 4 shows, among other things, that in a 12.0 ppg aqueous $CaBr_2$ solution, provides a coefficient of friction of equal to or less than 0.4 at a temperature of 75° F. at any time up through 10 minutes after combination of the 2% through 6% by volume of the composition to the 12.0 ppg aqueous $CaBr_2$ solution.

FIG. 5 shows, among other things, that in a 13.0 ppg aqueous $CaBr_2$ solution, provides a coefficient of friction of equal to or less than 0.11 at a temperature of 75° F. at any time up through 10 minutes after combination of the 2% through 6% by volume of the composition to the 13.0 ppg aqueous $CaBr_2$ solution.

FIG. 6 shows, among other things, that in a 14.0 ppg aqueous $CaBr_2$ solution, provides a coefficient of friction of equal to or less than 0.08 at a temperature of 75° F. at any time up through 10 minutes after combination of the 2% through 6% by volume of the composition to the 14.0 ppg aqueous $CaBr_2$ solution.

For the lubricity test data shown in FIGS. 7 and 8, the tests were performed in 14.0 ppg $CaBr_2$ brine solutions at 250° F., 300° F., 350° F., and 400° F. with two types of lubricants, namely lubricant 1 and lubricant 2 as above-identified in relation to FIGS. 1-6.

FIG. 7 shows, among other things, that from 0.25% through 1.75% by volume of the composition being lubricant 1, with the one or more liquids being present, in a 14.0 ppg aqueous $CaBr_2$ solution, provides a coefficient of friction of less than 0.03 at a temperature between 250° F. and 400° F. at any time up through 10 minutes after combination of the 0.25% through 1.75% by volume of the composition to the 14.0 ppg aqueous $CaBr_2$.

FIG. 8 shows, among other things, show that from 0.25% through 1.75% by volume of the composition being lubricant 2, with the one or more liquids being present, in a 14.0 ppg aqueous $CaBr_2$ solution, provides a coefficient of friction of less than 0.06 at a temperature between 250° F. and 400° F. at any time up through 10 minutes after combination of the 0.25% through 1.75% by volume of the composition to the 14.0 ppg aqueous $CaBr_2$.

For the lubricity test data shown in FIGS. 9 and 10, the tests were performed in 14.0 ppg $CaBr_2$ brine solutions at 250° F., 300° F., 350° F., and 400° F. with two types of lubricants, namely lubricant 1 and lubricant 2 as above-identified in relation to FIGS. 1-6.

FIG. 9 shows, among other things, that from 2% through 6% by volume of the composition being lubricant 1, with the one or more liquids being present, in a 14.0 ppg aqueous $CaBr_2$ solution, provides a coefficient of friction of less than 0.05 at a temperature between 250° F. and 400° F. at any time up through 10 minutes after combination of the 2% through 6% by volume of the composition to the 14.0 ppg aqueous $CaBr_2$.

FIG. 10 shows, among other things, show that from 2% through 6% by volume of the composition being lubricant 2, with the one or more liquids being present, in a 14.0 ppg aqueous $CaBr_2$ solution, provides a coefficient of friction of less than 0.06 at a temperature between 250° F. and 400° F. at any time up through 10 minutes after combination of the 2% through 6% by volume of the composition to the 14.0 ppg aqueous $CaBr_2$.

While the foregoing is directed to example embodiments of the disclosed invention, other and further embodiments may be devised without departing from the basic scope thereof, wherein the scope of the disclosed compositions are determined by one or more claims.

What is claimed is:

1. A composition comprising:
   a suspension package, wherein the suspension package comprises solids for suspending in one or more liquids, wherein the solids comprise tungsten and at least one of: (1) diamond dust, nano-diamonds, or combinations thereof; (2) graphite, graphene, or combinations thereof; and (3) silicon carbide,
   one or more activators consisting of clay-based activators and optionally: (i) water, (ii) surfactant(s), or (iii) both (i) and (ii); and
   one or more clay-based thixotropic additives;
   wherein from 0.25% through 6% by volume of the composition, with the one or more liquids being present, in a 14.0 ppg aqueous $CaBr_2$ solution, provides a coefficient of friction of equal to or less than 0.06 at a temperature between 250° F. and 400° F. at any time up through 10 minutes after combining the 0.25% through 6% by volume of the composition with the 14.0 ppg aqueous $CaBr_2$.

2. The composition of claim 1, wherein the one or more liquids are present in the composition, wherein the one or more liquids comprise one or more vegetable oils.

3. The composition of claim 1, wherein the suspension package comprises at least two of: (1) diamond dust, nano-diamonds, or combinations thereof; (2) graphite, graphene, or combinations thereof; and (3) silicon carbide.

4. The composition of claim 1, wherein the one or more liquids are present in the composition, wherein the one or more liquids comprise one or more synthetic oils.

5. The composition of claim 1, wherein the water is present as one of the one or more activators in the composition.

6. The composition of claim 4, wherein the one or more liquids further comprise one or more vegetable oils.

7. The composition of claim 1, wherein the suspension package is 10 wt. % or less of the composition when the one or more liquids are present in the composition.

8. The composition of claim 1, wherein the particle size of each of the diamond dust, nano-diamonds or combinations thereof is within a range from 5 through 25 nm.

9. The composition of claim 1, wherein the particle size of each of the graphite, graphene, or combinations thereof is greater than 50 nm.

10. The composition of claim 1, wherein the particle size of the silicon carbide is within a range from 10 through 160 nm.

11. The composition of claim 1, wherein the particle size of the tungsten is within a range from 35 through 90 nm.

12. The composition of claim 1, wherein the suspension package further comprises one or more additives.

13. The composition of claim 1, wherein the suspension package comprises: (1) diamond dust, nano-diamonds, or combinations thereof; (2) graphite, graphene, or combinations thereof; and (3) silicon carbide.

14. The composition of claim 1, wherein from 2% through 6% by volume of the composition, with the one or more liquids being present, in a 9.6 ppg aqueous $CaCl_2$ solution, provides a coefficient of friction of equal to or less than 0.03 at a temperature of 75° F. at any time up through 10 minutes after combining the from 2% through 6% by volume of the composition with the 9.6 ppg aqueous $CaCl_2$ solution.

15. The composition of claim 1, wherein from 2% through 6% by volume of the composition, with the one or more liquids being present, in a 11.6 ppg aqueous $CaCl_2$ solution, provides a coefficient of friction of equal to or less than 0.12 at a temperature of 75° F. at any time up through 10 minutes after combining of the from 2% through 6% by volume of the composition with the 11.6 ppg aqueous $CaCl_2$ solution.

16. The composition of claim 1, wherein from 2% through 6% by volume of the composition, with the one or more liquids being present, in a 12.0 ppg aqueous $CaBr_2$ solution, provides a coefficient of friction of less than 0.04 at a temperature of 75° F. at any time up through 10 minutes after combining of equal to or the from 2% through 6% by volume of the composition with the 12.6 ppg aqueous $CaBr_2$ solution.

17. The composition of claim 1, wherein from 2% through 6% by volume of the composition, with the one or more liquids being present, in a 13.0 ppg aqueous $CaBr_2$ solution, provides a coefficient of friction of equal to or less than 0.11 at a temperature of 75° F. at any time up through 10 minutes after combining of the from 0.25% through 6% by volume of the composition with the 13.0 ppg aqueous $CaBr_2$ solution.

* * * * *